US012568888B2

(12) United States Patent
Scharf et al.

(10) Patent No.: US 12,568,888 B2
(45) Date of Patent: Mar. 10, 2026

(54) SQUARE BALER

(71) Applicant: Usines CLAAS France SAS, St. Rémy/Woippy (FR)

(72) Inventors: Thorsten Scharf, Mettlach (DE); Michael Schulte, Dellbrück (DE); Thierry Walter, Longeville-lès-Metz (FR); Emile Gaucher, Chevillon (FR)

(73) Assignee: Usines CLAAS France SAS

( * ) Notice: Subject to any disclaimer, the term of this patent is extended or adjusted under 35 U.S.C. 154(b) by 717 days.

(21) Appl. No.: 17/945,182

(22) Filed: Sep. 15, 2022

(65) Prior Publication Data

US 2023/0084503 A1     Mar. 16, 2023

(30) Foreign Application Priority Data

Sep. 15, 2021    (DE) ..................... 10 2021 123 857.9

(51) Int. Cl.
*A01F 15/08*          (2006.01)

(52) U.S. Cl.
CPC ...... *A01F 15/0841* (2013.01); *A01F 15/0825* (2013.01)

(58) Field of Classification Search
CPC .............. A01F 15/0841; A01F 15/0825; A01F 15/042; F16H 37/124; F16H 37/0833; F16H 37/042; F16H 37/04; F16H 3/663; F16H 3/46; F16H 3/006; B60K 6/547; B60K 6/48; B60K 6/387; B30B 9/306
See application file for complete search history.

(56) References Cited

U.S. PATENT DOCUMENTS

| | | | |
|---|---|---|---|
| 5,899,054 A | 5/1999 | Hawlas et al. | |
| 6,105,353 A * | 8/2000 | Mohr | .................. A01D 69/005 |
| | | | 475/2 |
| 9,814,185 B2 | 11/2017 | Arnould et al. | |

(Continued)

FOREIGN PATENT DOCUMENTS

| | | |
|---|---|---|
| DE | 102014013325 A1 | 3/2016 |
| EP | 0819375 A1 | 1/1998 |
| EP | 2457432 A1 | 5/2012 |

OTHER PUBLICATIONS

European Search Report for European patent application No. 22180932.0-1105 mailed Dec. 13, 2022.

*Primary Examiner* — Jimmy T Nguyen
(74) *Attorney, Agent, or Firm* — Lempia Summerfield Katz LLC

(57) ABSTRACT

A square baler. The square baler includes: at least one ram arranged movably between end positions in a pressing channel, and a cutting rotor, and a drive train which is designed to drive at least the ram and the cutting rotor together, a torque input connection through which torque may be supplied to the drive train, and a first power split, such as a bevel gear stage, which is connected to the torque input connection. The drive train includes at least one reduction gear associated with the ram. The reduction gear associated with the ram and the cutting rotor are connected in parallel to each other to the first power split. At least one side gear is connected between the first power split and the at least one reduction gear associated with the ram. And, at least one flywheel is connected between the at least one reduction gear associated with the ram and the at least one side gear.

20 Claims, 3 Drawing Sheets

(56)               References Cited

U.S. PATENT DOCUMENTS

2014/0158002 A1    6/2014  O'reilly
2014/0165859 A1*  6/2014  O'Reilly ............ A01F 15/0841
                                        100/179

* cited by examiner

SQUARE BALER

CROSS REFERENCE TO RELATED APPLICATION

This application claims priority under 35 U.S.C. § 119 to German Patent Application No. 10 2021 123 857.9 filed Sep. 15, 2021, the entire disclosure of which is hereby incorporated by reference herein. This application is related to U.S. application Ser. No. 17/945,174, incorporated by reference herein in its entirety.

TECHNICAL FIELD

The present invention relates to a square baler.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Square balers are used in agriculture to pick up, for example, semi-mature harvested material such as straw, hay, grass or the like, which has been deposited in a swath, to shred it further, and to compress or press it into square bales. For this purpose, the square balers have various working units which serve for the required conveying and/or further processing of the harvested material. Such working units are, for example, a cutting rotor for shredding the collected harvested material, a feed rake for pre-compacting and feeding the harvested material shredded by the cutting rotor into a pressing channel of the square baler, a ram which is movably arranged or positioned in the pressing channel and presses the pre-compacted harvested material located in the pressing channel into a square bale, and a knotter which binds the pressed bale. These working units are usually drivingly connected with a central drive train of the square baler, which is connected to a power take-off shaft of an agricultural production machine, in particular a tractor, when the square baler is in operation.

DE 10 2014 013 325 A1 discloses a square baler that comprises a ram that may be moved in an oscillating manner in a pressing channel and at least one further working unit. See also U.S. Pat. No. 9,814,185, incorporated by reference herein in its entirety. The ram and the working unit are driven via a common drive train comprising a torque input connection, a power split and a reduction gear driving the ram. Both the power split and the ram-driving reduction gear comprise a bevel gear stage, wherein bevel gears of both stages are arranged or positioned on a same shaft. The reduction gear driving the ram and the one working unit are connected to the power split in parallel with each other. A flywheel is arranged or positioned on a shaft section connecting the torque input connection of the power train to the power split.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
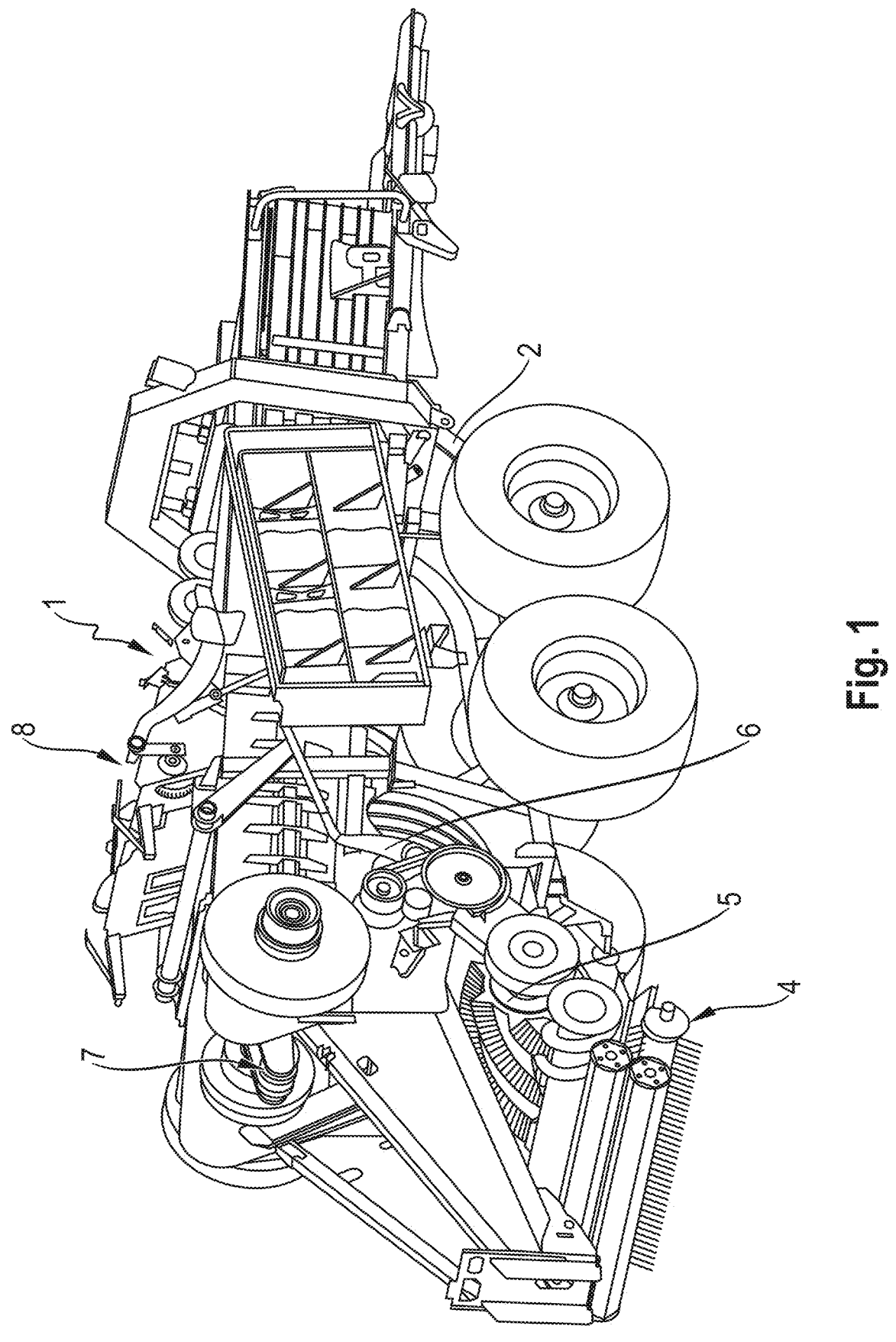
FIG. 1 shows a schematic and exemplary side view of a square baler according to the invention.

As discussed in the background, a typical square baler includes a drive train that permits the parallel drive of several working units of the square baler. Although such a design of the drive train permits the parallel drive of several working units of the square baler, it must generally be completely redesigned if the arrangement of the working units, the dimensioning of the working units and/or the drive power required by the working units changes. Furthermore, the flywheel in such a drive train must be relatively large in order to shield the drive unit of an agricultural machine connected to the square baler from torque shocks of the ram or the working units and to reduce rotational speed fluctuations of the drive train.

For example, insofar as drive power of the ram is to be increased, the conceptual design of the drive train, such as the gear components, must be fundamentally modified or revised. Such a structural redesign of the drive train with respect to different power requirements of the ram results in an increase in the weight of the square baler, which may be detrimental to the efficiency of an agricultural train comprising an agricultural production machine and a coupled square baler in operation, and a load applied to the ground by the agricultural train. Further, such a structural redesign may prove difficult to implement with respect to existing installation space restrictions of the square baler.

Apart from this, such a drive train or drive train concept is unsuitable (if at all only to a limited extent) for a modular design. Although the drive principle of the working units of a square baler does not change in and of itself, a specially designed and dimensioned drive train is therefore generally necessary for different performance classes or sizes of a model series of a square baler. This may be an obstacle to the economical manufacture and use of a square baler.

Accordingly, in one or some embodiments, a square baler is disclosed which reliably provides the drive power required to the drive units of the square baler, such as the drive power of the ram, while at the same time being distinguished by a simplified and modular design and a lighter weight.

Accordingly, in one or some embodiments, a square baler is disclosed that comprises at least one ram arranged or positioned movably between end positions (e.g., a plurality of end positions) in a pressing channel and a cutting rotor. The square baler may further comprise a drive train configured to jointly drive at least the at least one ram and the cutting rotor. The drive train may comprise a torque input connection through which a torque may be supplied to the drive train, a first power split, such as a bevel gear stage connected to the torque input connection, and at least one reduction gear associated with the ram. The reduction gear associated with the ram and the cutting rotor may be connected parallel to one another and may further be connected to the first power split. The square baler may further include: at least one side gear that is interposed (e.g., placed or inserted) between the first power split and the at least one reduction gear associated with the ram; and at least one flywheel that is interposed between the at least one reduction gear associated with the ram and the at least one side gear.

In one or some embodiments, the drive train concept of the square baler, such as the design of the drive train between the power split and the ram, may allow on the one hand to provide the high torque required for the operation of the ram at low rotational speed, and on the other hand may be characterized by a very simple but robust design. The combination of side gear and downstream flywheel may make it possible to dimension the flywheel smaller than in conventional drive trains known in the prior art. However, the tasks to be fulfilled by the flywheel, such as shielding torque shocks of the ram or the working units and the reduction of speed fluctuations of the drive train, may be effectively fulfilled to the same extent. Another advantage resulting from this arrangement is that a coupling between the torque input connection and the power split may be eliminated. In one or some embodiments, the flywheel may therefore be driven continuously during operation of the square baler, and the ram may be engaged as required, for example as soon as the flywheel has reached its operating speed.

In one or some embodiments, a decoupling of the first power split and the at least one reduction gear may be achieved using the at least one side gear may also ensure a modular design of the drive train, so that it may be adapted in an uncomplicated manner with regard to different power classes and sizes of square balers by replacing individual assemblies of the drive train, without having to fundamentally adapt the drive train concept or layout.

A further advantage between the first power split and the reduction gearbox is that the weight of the drive train may be reduced to a considerable extent, since a complex sequence of gears located centrally in the square baler may be dispensed with.

In one or some embodiments, an arrangement of at least one side gear between the first power split and the reduction gear may make it possible to bridge a spatial distance existing between the power split and the ram in a particularly simple manner, without drive train components being arranged or positioned in the center of the square baler between the first power split and the ram which may restrict space, such as installation space, which in turn may conflict with the design of the square baler.

In one or some embodiments, an output of the at least one side gear comprises the at least one flywheel.

In such an embodiment, the drive train may be adapted in a relatively uncomplicated manner with regard to different dimensions of the ram and associated loads acting during operation and required drive powers, in that only the output of the at least one side gear may be replaced, and the entire side gear does not have to be replaced. Such an embodiment may also simplify necessary maintenance work on the drive train and accessibility to assemblies of the drive train, for example the reduction gear, which may be connected downstream from the at least one side gear.

In one or some embodiments, the transmission ratio (interchangeably termed gear ratio or gearbox ratio) of the at least one side gear is $i<1$. Hereby, the rotational speed provided by means of a power take-off shaft of the agricultural production machine at the torque input connection may be increased by the at least one side gear, which may be particularly advantageous with regard to the special arrangement and design of the flywheel. A coupling between the torque input connection and the first power split may thus be omitted without the risk of stalling the drive unit of the agricultural production machine when the square baler is started up by the agricultural production machine, or in other operating situations.

In one or some embodiments, the at least one side gear is a traction gear, such as a V-belt gear.

The design of the at least one side gear as a traction gear makes it possible to compensate for torsion in the at least one reduction gear associated with the ram during operation of the square baler caused by a load generated by the ram during operation, and/or to prevent such torsion from being transmitted to other assemblies of the drive train since this could lead to damage or destruction of the assemblies.

In one or some embodiments, the use of a V-belt gearbox may be particularly advantageous in this context since it may allow the costs of the drive train to be kept low. However, chain gears may be used equally well with regard to the purpose. It is also contemplated to design the at least one side gear as a bevel gear stage, wherein a bevel gear of the bevel gear stage which is operatively connected to an output shaft of the first power split is connected by means of a cardan shaft to a second bevel gear, which in turn may drive the at least one flywheel.

In one or some embodiments, the drive train comprises exactly two reduction gears associated with the ram and exactly two side gears interposed between the first power split and the reduction gears associated with the ram. In particular, in this context, the drive train may comprise two flywheels and that one flywheel is always interposed between a reduction gear associated with the ram and an associated side gear.

An embodiment of the drive train with two reduction gears, two side gears and a plurality of flywheels (such as two flywheels) in each case may be particularly advantageous, especially for square balers which may require a very high torque on the ram and/or have to drive a larger dimensioned ram. The design of the drive train with two side gears, two reduction gears and a plurality of flywheels (such as two flywheels) which surround, on the right and left sides, a crankshaft which is arranged or positioned centrally in the transverse direction of the square baler and on which the ram is mounted, may reduce the load on the individual assemblies of the drive train by achieving homogeneous absorption of the load acting on the drive train by the ram. At the same time, the necessary drive power may be reliably provided, whereby the division into two side gears and two reduction gears may also reduce the load on the individual assemblies of the drive train to the required level.

In one or some embodiments, an output of each side gear comprises a flywheel.

As described above, this embodiment of the output drives allows the drivetrain to be adapted relatively simply with regard to different dimensions of the ram and the associated loads acting during operation and the required drive power, in that only the particular output drive of the side gear may be replaced, and the entire side gearbox does not always have to be replaced. Such an embodiment may also simplify necessary maintenance work on the drive train and may increase the accessibility to assemblies of the drive train, for example the reduction gears that are connected downstream from the side gears.

In one or some embodiments, the drive train comprises a reduction gear associated with the cutting rotor, and a side gear or an angular gear is interposed between the first power split and the reduction gear associated with the cutting rotor. In this way, the cutting rotor may be driven in parallel with the ram in a particularly advantageous manner, whereby the corresponding advantages previously mentioned with regard to the ram drive may be achieved by using the side gear or angular gear interposed between the first power split and the one reduction gear associated with the cutting rotor.

In one or some embodiments, the transmission ratio of the side gear or angular gear is i=1. By selecting the transmission ratio of i=1, an optimum drive power may be made available to the reduction gear of the cutting rotor, which may then be converted by the reduction gear to the drive power required for the operation of the cutting rotor. Since the drive power required for operating the cutting rotor may be different from the drive power required for operating the ram, the transmission ratio of the side gear or angular gear supplying the drive power for the cutting rotor may be different from that of the side gear supplying the drive power for the plunger. According to an alternative development, however, the transmission ratio of the side gear or angular gear may also be i≠1.

In one or some embodiments, the side gear is a traction gear or a spur gear, or the angular gear is a bevel gear stage. In particular, the side gear may be designed as a traction gear is a V-ribbed belt gear. In this case as well, the advantages arise in the same way as they do when the side gear is selected between the first power split and the reduction gear of the press ram. In one or some embodiments, the side gear may be designed as a traction gear. The choice of a suitable embodiment of the side gear may be made with regard to the installation space restrictions present in the square baler.

In one or some embodiments, the reduction gear associated with the cutting rotor is a multi-stage spur gear.

In one or some embodiments, the planetary gear is a single-stage planetary gear. A sun gear of the planetary gear may be drivable using the side gear or angular gear. The planet carriers of the planetary gear may be connected to the cutting rotor, and the planetary gear may be configured for output via the planet carriers.

The design of the side gear unit as a single-stage planetary gear unit may allow the provided power to be converted to the power required to drive the cutting rotor to the same extent as the embodiment as a spur gear. The use of a planetary gear, in contrast to a spur gear, may be characterized by the fact that the power is transmitted not only via one tooth of a gearwheel, but simultaneously via one tooth of each planetary gear. This may considerably reduce the load on the gear components forming the reduction gear in comparison to an embodiment as a spur gear. A planetary gear may also likewise be distinguished by a compact and space-saving design.

In one or some embodiments, the at least one side gear is followed by a second power split which is designed to operate at least one further working unit of the square baler in parallel with the ram and the cutting rotor.

In one or some embodiments, the second power split comprises a multi-stage spur gear. By forming a second power split, at least one further drive unit of the square baler, for example a knotter or a feed rake, may be driven in parallel with the ram and the cutting rotor. The embodiment in the form of a multi-stage spur gear may ensure that a spatial distance between the ram drive and the at least one further working unit may be transmitted in an uncomplicated but reliable manner, and the drive power may already be (pre-)translated with regard to a drive power required for the operation of the at least one further working unit.

In one or some embodiments, the second power split is associated with the at least one reduction gear associated with the ram.

According to a further advantageous development of the invention, in the event that the drive train comprises two reduction gears associated with the ram, the second power split may be associated with one of the two reduction gears associated with the ram. The association of the second power split with the at least one reduction gear may also serve the purpose of simplifying the design of the drive train and saving weight since existing and necessary gear structures may be accessed to distribute the power to additional working units. Furthermore, no additional installation space may be required in the area between at least one side gear and the crankshaft of the ram in order to form the power split.

In one or some embodiments, a third power split is connected downstream from the second power split and is designed to operate two further working units of the square baler in parallel with the ram and the cutting rotor. In one or some embodiments, in this case, the third power split may comprise a bevel gear stage.

By forming a third power split, two further drive units of the square baler, for example the feed rake and knotter, may be driven in parallel to the ram and the cutting rotor. An intelligent drive train concept may therefore be created that may enable a parallel and coordinated drive of several drive units of the square baler, which may be characterized by a lower weight and a high degree of modularity.

Referring to the figures, FIG. 1 shows a schematic and exemplary representation of an embodiment of the square baler 1. The square baler 1 may be coupled to an agricultural production machine not shown in the figures, such as a tractor, so that the square baler 1 and the agricultural production machine may jointly form a so-called agricultural train. The square baler 1 comprises a housing, not shown in FIG. 1, which surrounds the components of the square baler 1 attached to a chassis 2 of the square baler 1.

Figure 2:
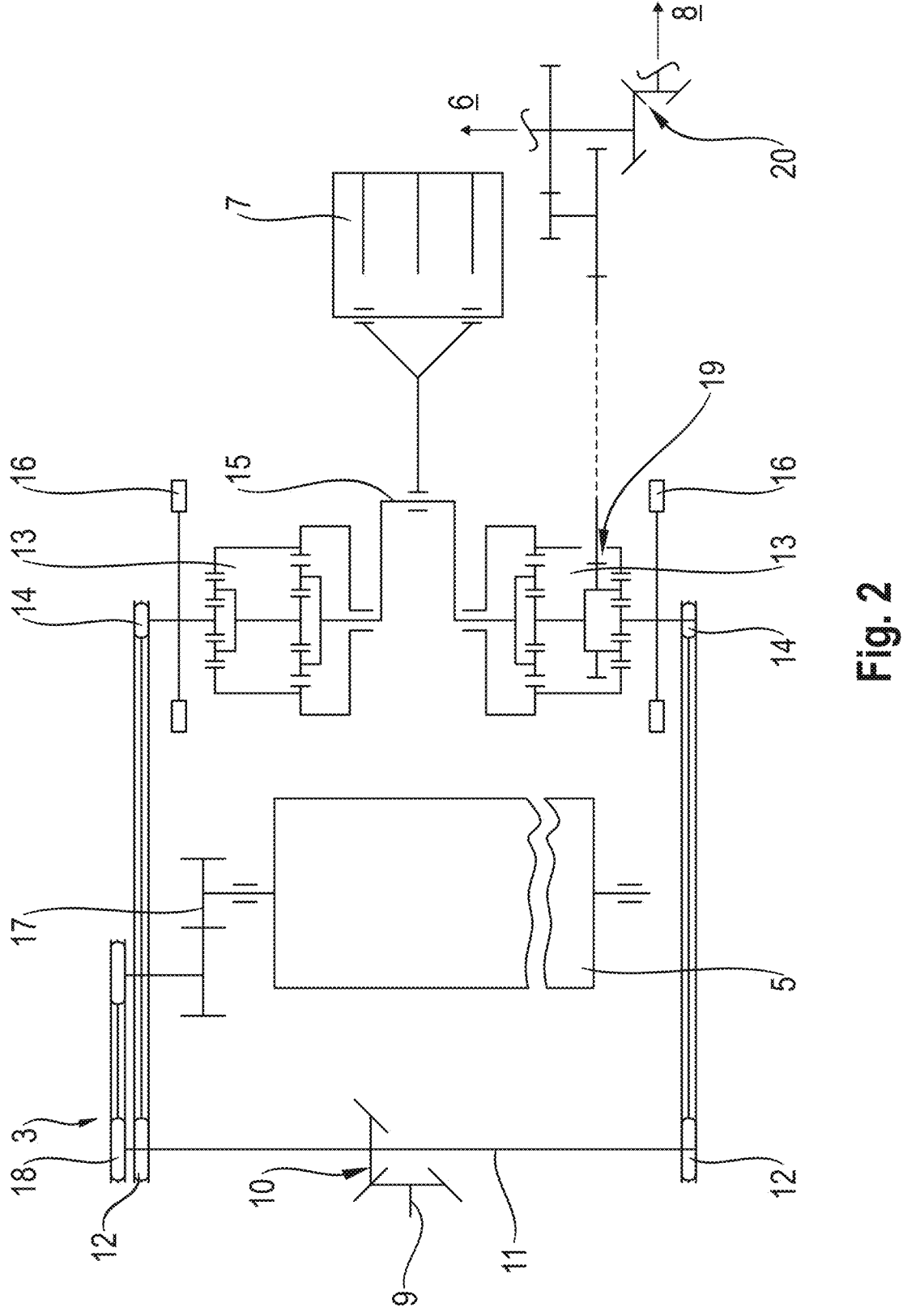
FIG. 2 shows a schematic and exemplary representation of a first embodiment of a drive train of the square baler according to the invention according to FIG. 1.
Figure 3:
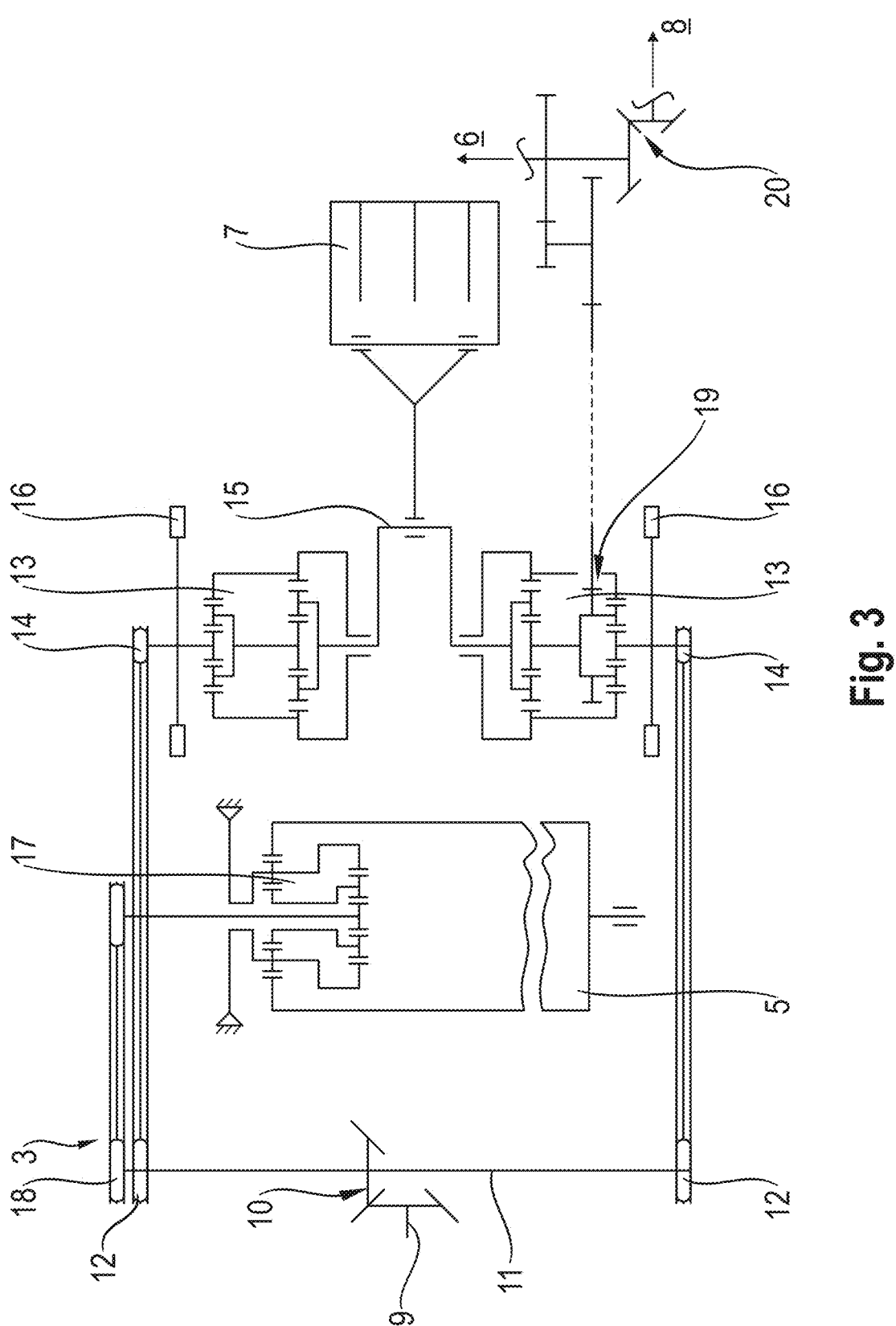
FIG. 3 shows a schematic and exemplary representation of a second embodiment of a drive train of the square baler according to the invention according to FIG. 1.

The square baler 1 may further comprises a drive train 3 shown in more detail in FIGS. 2 and 3, through which various working units of the square baler 1 are driven. Such working units may, for example, be any one, any combination, or all of: a pick-up device 4 known as a pick-up for picking up harvested material deposited in a swath on an agricultural area; a cutting rotor 5 for shredding the picked-up harvested material; a feed rake 6 for pre-compressing the shredded harvested material and feeding it into a pressing channel of the square baler 1; a ram 7 movably arranged or positioned between end positions in the pressing channel of the square baler 1 for pressing the pre-compressed crop into a square bale; and a knotter 8 for binding the pressed square bale.

The drive train 3 of the square baler 1 may be supplied with a drive output using the agricultural production machine, such as the tractor. For this purpose, at the rear, the agricultural production machine may comprise a power take-off known to one of skill in the art. The drive train 3 of the square baler 1 comprises a drive shaft 9 which in turn comprises a torque input connection of the drive train 3, through which the drive train 3 of the square baler 1 may be connected to the power take-off of the agricultural production machine.

A first power split 10, which may be formed as a bevel gear stage, may be connected to the drive shaft 9 of the drive train 3. One bevel gear of the first power split, which may be formed as a bevel gear stage, comprises an output shaft 11 which may extend transversely to the drive shaft 9 (e.g., transversely to the main extension direction of the square baler 1 (e.g., transversely to a longitudinal direction of the square baler 1)), to which the other bevel gear of the bevel gear stage may be connected.

In one or some embodiments, a transmission ratio of the first power split 10 i<1, so that the rotational speed of the output shaft 11 is higher than the rotational speed of the input shaft 9.

A spur gear may be arranged or positioned on the drive shaft 9, such as immediately upstream from the first power split 10, which may be configured to drive a hydraulic pump that may supply components of the drive train 3 and/or the square baler 1 with a hydraulic fluid.

At least one side gear 12 (interchangeably termed a side gearbox), more specifically the drive of at least one side gear 12, may be arranged or positioned on the output shaft 11 of the first power split 10. The at least one side gear 12 transmits the drive power split using the first power split 10 to the ram drive. The at least one side gear 12 may be designed as a traction gear, such as a V-belt gear, but may also be designed as another traction gear, for example a chain gear, or also as a bevel gear stage. In one or some embodiments, if the at least one side gear 12 is designed as a bevel gear stage, the bevel gear stage comprises two bevel gears connected to each other using a cardan shaft.

The transmission ratio of the at least one side gear 12 may be i<1, but other transmission ratios are also contemplated. However, a transmission ratio of i<1 may be considered particularly advantageous with regard to the arrangement of a flywheel 16 according to the invention, which will be described in detail below.

As shown in FIGS. 2 to 3, two such side gears 12 or the drives of two such side gears 12 may also be arranged or positioned on the output shaft 11. Insofar as two such side gears 12 are present, these side gears 12 or the drives of these side gears 12 may be arranged or positioned at a distance from one another in the transverse direction to the drive shaft 9 (e.g., transversely to the main extension direction of the square baler 1 (e.g., transversely to a longitudinal direction of the square baler 1)) surrounding the first power split 10 on both sides on the output shaft 11, such as in the end regions thereof.

The drive train 3 may further comprise at least one reduction gear 13 associated with the ram 7, to which is supplied the drive power transmitted by the at least one side gear 12, more specifically via an output 14 of the at least one side gear 12. In other words, the at least one side gear 12 may be interposed between the first power split 10 and the at least one reduction gear 13 associated with the ram 7.

In one or some embodiments, the at least one reduction gear 13 associated with the ram 7 is connected on the output side to a crankshaft 15 on which the ram 7 is mounted, so that the ram 7 may be moved between its end positions in the press channel.

The at least one reduction gear 13 associated with the ram 7 may be designed in the form of a spur gear or a planetary gear.

As shown in FIGS. 2 to 3, the drive train 3 may also comprise two such reduction gears 13, wherein each of the reduction gears 13 associated with the ram 7 is connected on the output side to the crankshaft 15 which, in such a case, may be arranged or positioned between the two reduction gears 13 Drive power may be supplied to each of the reduction gears 13 associated with the ram 7 from each of the two side gears 12, such as via the particular output 14 of the side gear 12. However, it is also possible that there is only one reduction gear 13 associated with the ram 7. In such a case, the drive may be provided by only one side gear 12, and the crankshaft 15 is rotatably mounted by one end in the housing of the square baler 1.

The drive train 3 may further comprise at least one flywheel 16. The at least one flywheel 16 may be interposed between the at least one side gear 12 and the at least one reduction gear 13 associated with the ram 7. The at least one flywheel 16 may be associated with the output 14 of the at least one side gear 12. In other words, the at least one flywheel 16 may form part of the output 14 of the at least one side gear 12. For example, the at least one flywheel 16 may be integrally manufactured with the output 14 of the at least one side gear 12, or may be positively, non-positively and/or materially connected to the output 14. Unlike in the prior art, the at least one flywheel 16 may therefore not be arranged or positioned between the torque input connection and a power split corresponding to the first power split 10, but may be associated with the actual ram drive, or stated more specifically, may be interposed between the at least one side gear 12 and the at least one reduction gear 13 associated with the ram 7.

As shown in FIGS. 2 to 3, the drive train 3 may also comprise two such flywheels 16, wherein in such a case, one flywheel 16 is associated with each output 14 of each of the two side gears 12.

In one or some embodiments of the drive train 3, such as in the region between the first power split 10 and the ram 7, makes it possible to provide a high torque required for the pressing process at a low speed in a particularly advantageous manner, while at the same time ensuring a high level of operational safety and reliability. This embodiment of the drive train 3 is further distinguished by a low weight and the advantageous utilization of installation space, and may be modular so that the drive train 3 may be easily adapted in the event of a change in the dimensioning of the working units or in the event of a change in the required drive power, without the drive train 3 having to be fundamentally revised.

In one or some embodiments, a coupling between the torque input connection and the first power split 10 may be omitted in this case so that the at least one flywheel 16 is driven continuously. The ram 7 may be engaged as soon as the at least one flywheel 16 has reached its nominal speed and may be operated with the required drive power.

In one or some embodiments, a "high torque" comprises a torque that is substantially higher than the torque provided at the torque input connection by the agricultural production machine, such as by at least a factor greater than 10, at least a factor greater than 20, at least a factor greater than 30, or a factor in a range of 40 to 50. In one or some embodiments, a "low rotational speed" comprises a rotational speed that is substantially lower than the rotational speed provided at the drive shaft 9 by the agricultural production machine, such as by at least a factor lower than 10, by at least a factor lower than 15, or by a factor of about 20.

Furthermore, drive power may also be supplied to the cutting rotor 5 of the square baler 1 starting from the first power split 10. Accordingly, the reduction gear 13 associated with the ram 7 and the cutting rotor 5 may be connected in parallel to each other to the first power split 10. In this context, the drive train 3 of the square baler 1 may comprise a reduction gear 17 associated with the cutting rotor 5. In one or some embodiments, interposed between the first power split 10 and the reduction gear 17 associated with the cutting rotor 5 is a further gear 18 (interchangeably termed gearbox) which may designed either as a side gear or as an angular gear.

Insofar as the gear 18 is designed as a side gear, it may be arranged or positioned, just like the at least one side gear 12 interposed between the first power split 10 and the at least one reduction gear 13 associated with the ram 7, on the output shaft 11 of the first power split 10, such as in an edge region of the output shaft 11. In one or some embodiments, the gear 18, designed as the side gear, may be designed as a traction gear, such as a V-ribbed belt gear, or as a spur gear, wherein an output of the side gear may be configured to drive the reduction gear 17 associated with the cutting rotor 5.

Insofar as the gear 18 is designed as an angular gear, the angular gear may comprise a bevel gear stage with two bevel gears interconnected by a cardan shaft, wherein one bevel gear forms part of the first power split 10, and may therefore be driven via a bevel gear of the first power split 10, and the other bevel gear drives the reduction gear 17 associated with the cutting rotor 5.

In one or some embodiments, the transmission ratio of the gear 18, independent of the specific embodiment as a side gear or angular gear, is i=1. Alternatively, however, it is also contemplated that the transmission ratio of the side gear or angular gear may be i≠1.

FIG. 2 and FIG. 3 each illustrate different embodiments of the drive train 3 of the square baler 1. Both drive trains 3 differ from each other only in that the reduction gear 17 associated with the cutting rotor 5 and driven by the gear 18 may have a different design.

In the embodiment depicted in FIG. 2, the reduction gear 17 associated with the cutting rotor 5 is designed as a spur gear. Such a spur gear (e.g., the reduction gear 17 as a spur gear) may comprise a plurality of gear stages to convert the drive power provided by the gear 18 into drive power required to operate the cutting rotor 5, wherein the output of the spur gear directly drives the cutting rotor 5.

In the embodiment of the drive train 3 shown in FIG. 3, the reduction gear 17 associated with the cutting rotor 5 is a single-stage planetary gear. The output of the gear 18 may drive a shaft on which a sun gear of the planetary gear (e.g., the reduction gear 17 as the planetary gear) is mounted in a rotationally fixed manner. A ring gear of the planetary gear may be non-rotatably connected to a housing of the planetary gear, so that the drive power supplied to the planets via the sun gear is transmitted to the planet carriers which are connected to and drive the cutting rotor 5.

The embodiment of the drive train 3, such as in the region between the first power split 10 and the cutting rotor 5, may make it possible to provide a high torque required for shredding the harvested material at a low speed in a particularly advantageous manner. In one or some embodiments, a "high torque" in this context may comprise a torque that is considerably higher than the torque provided at the torque input connection by the agricultural production machine, but lower than the torque required for the pressing operation, such as higher by a factor of about 10 (e.g., higher at least by a factor of 5; higher at least by a factor of 10) than the torque provided at the torque input connection by the agricultural production machine. In one or some embodiments, a "low rotational speed" comprises a rotational speed considerably lower than the rotational speed provided at the drive shaft 9 by the agricultural production machine, but higher than the rotational speed at which the ram 7 is driven, such as lower by a factor of about 8 (e.g., lower by at least a factor of 5; lower by at least a factor of 8) than the rotational speed provided at the drive shaft 9 by the agricultural production machine.

In one or some embodiments, it may also be provided that, starting from the reduction gear 17 associated with the cutting rotor 5 or starting from the output of the gear 18, the pick-up device 4 of the square baler 1, such as individual modules of the pick-up device 4, are driven. For this purpose, further gears or gear stages may be present which cooperate indirectly or directly with the reduction gear 17 or the gear 18.

In one or some embodiments, the drive train 3 of the square baler 1 may comprise a second power split 19 connected downstream from the at least one side gear 12. Using the second power split 19, at least one further working unit not shown in FIGS. 2 and 3, for example a feed rake 6 or a knotter 8, may be driven in parallel with the ram 7 and the cutting rotor 5.

In one or some embodiments, the second power split 19 may be associated with the at least one reduction gear 13 associated with the ram 7, or may form a component of the reduction gear 13. In the case of two reduction gears 13 associated with the ram 7, the second power split 19 may be associated with only one of the reduction gears 13. As indicated schematically in FIGS. 2 and 3, the second power split 19 may comprise a multi-stage spur gear. This may allow the split off drive power to be (pre) converted taking into account drive power required for the operation of the further working unit.

So that not only one further working unit, but two further working units not shown in FIGS. 2 and 3, such as for example a feed rake 6 and a knotter 8, may be supplied with drive power by the drive train 3 in parallel to the cutting rotor 5 and the ram 7, the drive train 3 may comprise a third power split 20. This third power split 20 is connected downstream from the second power split 19 and may comprise a bevel gear stage. This third power split 20 may also (pre-)convert the branched drive power already taking into account drive power required for the operation of the further working unit(s).

In one or some embodiments, each further working unit 4, 6, 8 of the square baler 1 connected to the drive train 3 may, just like the cutting rotor 5 and the ram 7, have a gear not shown in the figures through which to provide the drive power required for the operation of the particular working unit 4, 6, 8.

In one or some embodiments, each transmission device of the drive train 3 may be assigned a device for load detection, which may be connected in a data-transmitting manner to a control device of the square baler 1 and/or of the agricultural production machine, not shown in FIGS. 1 to 3, and/or the agricultural production machine in a data-transmitting manner. The data detected using the devices for load detection may be further processed by the control device(s) and used for the operation, such as a fully automatic operation, of the square baler 1. The control device may include any type of computing functionality, such as at least one processor (which may comprise a microprocessor, controller, PLA, or the like) and at least one memory. The memory may comprise any type of storage device (e.g., any type of memory). The processor and the memory may comprise separate elements, or may be part of a single machine, which includes a microprocessor (or other type of controller) and a memory. Alternatively, the processor may rely on memory for all of its memory needs. The processor and memory are merely one example of a computational configuration. Other types of computational configurations are contemplated.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Square baler
2 Chassis
3 Drive train
4 Pick-up device
5 Cutting rotor
6 Feed rake
7 Ram
8 Knotter
9 Drive shaft
10 First power split
11 Output shaft
12 Traction gear
13 Reduction gear (ram)
14 Traction gear output
15 Crankshaft (ram)
16 Flywheel
17 Reduction gear (cutting rotor)
18 Side gear or angular gear
19 Second power split
20 Third power split

The invention claimed is:

1. A square baler comprising:
at least one ram positioned movably between end positions in a pressing channel and a cutting rotor; and
a drive train configured to drive at least the ram and the cutting rotor, the drive train comprising:
a torque input connection through which torque is supplied to the drive train;
at least one power split connected to the torque input connection;
at least one reduction gear associated with the at least one ram, wherein the at least one reduction gear associated with the at least one ram and the cutting rotor are connected to the at least one power split;
at least one side gear connected between the at least one power split and the at least one reduction gear assigned to the ram; and
at least one flywheel connected between the at least one reduction gear assigned to the ram and the at least one side gear,
wherein the at least one gear is indirectly drivable by a power take-off shaft of an agricultural production machine.

2. The square baler of claim 1, wherein the at least one reduction gear associated with the at least one ram and the cutting rotor are in parallel to one another and connected to the at least one power split; and
wherein the at least one power split comprises a bevel gear stage.

3. The square baler of claim 1, wherein an output of the at least one side gear comprises the at least one flywheel.

4. The square baler of claim 1, wherein a transmission ratio of the at least one side gear is i<1.

5. The square baler of claim 1, wherein the at least one side gear comprises a traction gear.

6. The square baler of claim 5, wherein the traction gear comprises a V-belt gear.

7. The square baler of claim 1, wherein the drive train comprises exactly two reduction gears associated with the at least one ram and exactly two side gears interposed between the at least one power split and the at least one reduction gear associated with the at least one ram.

8. The square baler of claim 7, wherein the drive train comprises two flywheels;
wherein one flywheel is always interposed between the at least one reduction gear associated with the at least one ram and an associated side gear.

9. The square baler of claim 8, wherein an output of the at least one side gear comprises the one flywheel.

10. The square baler of claim 1, wherein the drive train comprises a reduction gear associated with the cutting rotor; and
wherein at least one of a side gear or an angular gear is interposed between the at least one power split and the at least one reduction gear.

11. The square baler of claim 10, wherein a transmission ratio of the at least one of the side gear or the angular gear is i=1.

12. The square baler of claim 10, wherein the side gear comprises a traction gear or a spur gear; or
wherein the angular gear comprises a bevel gear stage.

13. The square baler of claim 10, wherein the at least one reduction gear associated with the cutting rotor is a multi-stage spur gear.

14. The square baler of claim 10, wherein the at least one reduction gear associated with the cutting rotor is a single-stage planetary gear;
wherein a sun gear of the planetary gear is configured to be driven using the at least one side gear or the angular gear;
wherein planet carriers of the planetary gear are connected to the cutting rotor; and
wherein the planetary gear is designed for output via the planet carriers.

15. The square baler of claim 1, wherein the at least one power split comprises a first power split;
wherein the at least one side gear is followed by a second power split; and
wherein the second power split is configured to operate at least one further working unit of the square baler in parallel with the ram and the cutting rotor.

16. The square baler of claim 15, wherein the second power split comprises a multi-stage spur gear.

17. The square baler of claim 15, wherein the second power split is associated with the at least one reduction gear associated with the ram.

18. The square baler of claim 17, wherein the at least one reduction gear comprises at least two reduction gears; and
wherein at least one of the at least two reduction gears is associated with the ram.

19. The square baler of claim 15, wherein the at least one further working unit comprises at least two further working units;
wherein the second power split is followed by a third power split; and
wherein the third power split is configured to operate the at least two further working units of the square baler in parallel with the ram and the cutting rotor.

20. The square baler of claim 19, wherein the third power split comprises a bevel gear stage.

* * * * *